(12) United States Patent
Papini et al.

(10) Patent No.: US 9,906,082 B2
(45) Date of Patent: Feb. 27, 2018

(54) ELECTRIC MACHINE HAVING REDUCED TORQUE OSCILLATIONS AND AXIAL THRUST

(71) Applicant: GENERAL ELECTRIC COMPANY, Schenectady, NY (US)

(72) Inventors: Francesco Papini, Munich (DE); Alexander Felix Fiseni, Munich (DE); Mohamed Osama, Garching (DE); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 592 days.

(21) Appl. No.: 14/313,380

(22) Filed: Jun. 24, 2014

(65) Prior Publication Data

US 2015/0069879 A1   Mar. 12, 2015

Related U.S. Application Data

(63) Continuation-in-part of application No. 14/019,630, filed on Sep. 6, 2013.

(51) Int. Cl.
*H02K 1/28* (2006.01)
*H02K 1/24* (2006.01)
(Continued)

(52) U.S. Cl.
CPC ........... *H02K 1/246* (2013.01); *H02K 1/2766* (2013.01); *H02K 1/30* (2013.01); *H02K 2201/06* (2013.01); *Y10T 29/49012* (2015.01)

(58) Field of Classification Search
CPC ............ H02K 1/28; H02K 1/30; H02K 1/278; H02K 1/2733; H02K 29/03; H02K 2201/06

See application file for complete search history.

(56) References Cited

U.S. PATENT DOCUMENTS 4,139,790 A   2/1979   Steen
4,454,438 A   6/1984   Yamashita et al.
(Continued)

FOREIGN PATENT DOCUMENTS

EP   1689066 A2   8/2006
JP   62193537 A   8/1987
(Continued)

OTHER PUBLICATIONS

Ha et al., "Physical Understanding of High Frequency Injection Method to Sensorless Drives of an Induction Machine", Industry Applications Conference, Conference Record of the 2000 IEEE, Rome, vol. No. 3, pp. 1802-1808, 2000.

(Continued)

*Primary Examiner* — Dang Le
(74) *Attorney, Agent, or Firm* — Pabitra K. Chakrabarti

(57) ABSTRACT

A component that includes a longitudinal axle, having a multiple keybars that extend outward from a surface of the axle, such that each of the keybars are disposed axially along and circumferentially around the axle. Also the axis of the keybars is parallel to the axle, such that a profile of all midpoints of the keybars is helicoidal around the axle, also the helicoidal profile is such that they make up one or more helicoidal paths. The profile may be herringbone skewed. The component may be part of a rotor assembly that is part of an electric machine such as an interior permanent magnet (IPM) or Synchronous Reluctance motor.

29 Claims, 7 Drawing Sheets

(51) Int. Cl.
*H02K 1/27* (2006.01)
*H02K 1/30* (2006.01)

(56) References Cited

U.S. PATENT DOCUMENTS

| | | | |
|---|---|---|---|
| 4,490,638 A | 12/1984 | Lind | |
| 4,631,435 A | 12/1986 | McCarty | |
| 4,651,066 A | 3/1987 | Gritter et al. | |
| 5,565,752 A | 10/1996 | Jansen et al. | |
| 5,886,440 A | 3/1999 | Hasebe et al. | |
| 5,886,498 A | 3/1999 | Sul et al. | |
| 5,936,323 A | 8/1999 | Shibukawa et al. | |
| 6,058,596 A | 5/2000 | Jansen et al. | |
| 6,069,467 A | 5/2000 | Jansen | |
| 6,137,258 A | 10/2000 | Jansen | |
| 6,388,353 B1 * | 5/2002 | Liu | F04B 13/00 310/114 |
| 6,388,420 B1 | 5/2002 | Jansen et al. | |
| 6,639,380 B2 | 10/2003 | Sul et al. | |
| 6,707,209 B2 | 3/2004 | Crapo et al. | |
| 6,763,622 B2 | 7/2004 | Schulz et al. | |
| 6,801,011 B2 | 10/2004 | Ide | |
| 6,822,418 B2 | 11/2004 | Harke | |
| 6,847,144 B1 | 1/2005 | Luo | |
| 6,867,524 B2 | 3/2005 | Liang | |
| 6,876,115 B2 | 4/2005 | Takahashi et al. | |
| 6,894,454 B2 | 5/2005 | Patel et al. | |
| 6,924,617 B2 | 8/2005 | Schulz et al. | |
| 6,967,461 B1 | 11/2005 | Markunas et al. | |
| 6,975,050 B2 | 12/2005 | Cleanthous et al. | |
| 7,034,423 B2 | 4/2006 | Crapo et al. | |
| 7,045,988 B2 | 5/2006 | Ha et al. | |
| 7,088,077 B2 | 8/2006 | Nagashima et al. | |
| 7,190,130 B2 | 3/2007 | Wogari et al. | |
| 7,245,054 B1 | 7/2007 | Walls et al. | |
| 7,342,338 B2 | 3/2008 | Miyazaki et al. | |
| 7,348,749 B2 | 3/2008 | Ide et al. | |
| 7,541,710 B2 * | 6/2009 | Nemoto | H02K 1/22 310/156.45 |
| 7,679,308 B2 | 3/2010 | Tomigashi | |
| 7,768,220 B2 | 8/2010 | Schultz et al. | |
| 7,902,710 B2 | 3/2011 | Han et al. | |
| 7,902,711 B2 | 3/2011 | Bissenbach et al. | |
| 7,969,058 B2 | 6/2011 | Rahman et al. | |
| 8,018,109 B2 | 9/2011 | Leonardi et al. | |
| 8,035,273 B2 | 10/2011 | Ionel et al. | |
| 8,067,872 B2 | 11/2011 | Pedersen et al. | |
| 8,120,223 B2 | 2/2012 | Leonardi et al. | |
| 8,129,881 B2 | 3/2012 | Hoesle | |
| 8,217,545 B2 | 7/2012 | Kawasaki et al. | |
| 8,228,013 B2 | 7/2012 | Liu et al. | |
| 8,247,940 B2 * | 8/2012 | Hino | H02K 1/276 310/156.47 |
| 8,378,534 B2 | 2/2013 | Houle et al. | |
| 8,405,269 B2 | 3/2013 | Spaggiari | |
| 8,436,504 B2 | 5/2013 | Liang et al. | |
| 8,508,094 B2 | 8/2013 | Matt | |
| 8,536,748 B2 | 9/2013 | Liang et al. | |
| 9,093,878 B2 | 7/2015 | Huh et al. | |
| 9,641,033 B2 * | 5/2017 | Papini | H02K 1/28 |
| 2002/0140307 A1 | 10/2002 | Yanashima et al. | |
| 2003/0209950 A1 | 11/2003 | Biais et al. | |
| 2004/0256944 A1 | 12/2004 | Kaneko | |
| 2005/0121990 A1 * | 6/2005 | Kaneko | H02K 29/03 310/156.47 |
| 2005/0140236 A1 | 6/2005 | Jeong et al. | |
| 2008/0129243 A1 | 6/2008 | Nashiki | |
| 2009/0315505 A1 | 12/2009 | Denk et al. | |
| 2011/0031843 A1 | 2/2011 | Liang et al. | |
| 2011/0074231 A1 | 3/2011 | Soderberg | |
| 2011/0080068 A1 | 4/2011 | Dawson et al. | |
| 2011/0304235 A1 | 12/2011 | Hashiba et al. | |
| 2012/0062160 A1 | 3/2012 | Yang et al. | |
| 2012/0235533 A1 | 9/2012 | Tanaka et al. | |
| 2013/0093369 A1 | 4/2013 | Leonardi et al. | |
| 2013/0119810 A1 | 5/2013 | Aoyama | |
| 2013/0154426 A1 | 6/2013 | Melfi et al. | |
| 2015/0069863 A1 | 3/2015 | Papini et al. | |
| 2015/0084471 A1 | 3/2015 | Huh et al. | |

FOREIGN PATENT DOCUMENTS

| | | |
|---|---|---|
| JP | 2011055641 A | 3/2011 |
| RU | 2167481 C1 | 5/2001 |
| RU | 2406209 C2 | 12/2010 |
| RU | 119541 U1 | 8/2012 |
| WO | 8705164 A1 | 8/1987 |
| WO | 2012129799 A1 | 10/2012 |

OTHER PUBLICATIONS

Jang et al., "Sensorless Drive of Surface-mounted Permanent-magnet Motor by High-Frequency Signal Injection Based on Magnetic Saliency", IEEE Transactions on Industry Applications, vol. No. 39, Issue No. 4, pp. 1031-1039, Jul.-Aug. 2003.

Cupertino et al., "Sensorless Control of Linear Tubular Permanent Magnet Synchronous Motors Using Pulsating Signal Injection", IEEE Industry Applications Society Annual Meeting, IEEE, Edmonton, pp. 1-8, Oct. 5-9, 2008.

Kang, "Sensorless Control of Permanent Magnet Motors", Control Engineering, vol. No. No. 57, Issue No. 4, Apr. 2010.

Yang et al., "Surface Permanent Magnet Synchronous Machine Design for Saliency-Tracking Self-Sensing Position Estimation at Zero and Low Speeds", IEEE Energy Conversion Congress and Exposition (ECCE), pp. 3493-3500, Sep. 12-16, 2010.

Faggion et al., "Ringed-Pole Permanent-Magnet Synchronous Motor for Position Sensorless Drives", IEEE Transactions on Industry Applications, vol. No. 47, Issue No. 4, pp. 1759-1766, May 12, 2011.

Barcaro et al., "Predicted and Experimental Anisotropy of a Dual Three-Phase Interior Permanent Magnet Motor for Sensorless Rotor Position Control", Power Electronics, Machines and Drives (PEMD 2012), 6th IET International Conference, Bristol, pp. 1-6, Mar. 27-29, 2012.

Wang et al., "A Permanent Magnet Integrated Starter Generator for Electric Vehicle Onboard Range Extender Application", IEEE Transactions on Magnetics, vol. No. 48, Issue No. 4, pp. 1625-1628, Apr. 2012.

Bianchi et al., "Analysis and Experimental Tests of The Sensorless Capability of a Fractional-Slot Inset PM Motor", Sensorless Control for Electrical Drives (SLED), IEEE Symposium,Milwaukee, WI, IEEE, pp. 1-6, Sep. 21-22, 2012.

Marcie, "Comparison of Induction Motor and Line-Start IPM Synchronous Motor Performance in a Variable-Speed Drive", IEEE Transactions on Industry Applications, vol. No. 48, Issue No. 6, pp. 2341-2352, Nov./Dec. 2012.

Faggion et al., "Sensorless Capability of Fractional-Slot Surface-Mounted PM Motors", IEEE Transactions on Industry Applications, vol. No. 49, Issue No. 3, pp. 1325-1332, May/Jun. 2013.

Australian Patent Examination Report issued in connection with related AU Application No. 2014259500 dated Jun. 18, 2015.

Canadian Office Action issued in connection with related CA Application No. 2869835 dated Jan. 5, 2016.

Unofficial English translation of Kazakhstan Office Action issued in connection with related KZ Application No. 2014/2531.1 dated Jan. 7, 2016.

J. Wang et al.,"Cogging torque reduction in interior permanent magnet brushless dc motor with flux-concentration type rotor", IEEE International Conference, Nov. 15-18, 2009, pp. 1-6.

C. Fu et al.,"The design of Interior Permanent Magnet brushless motor control system based on finite element method", IEEE 2010 2nd International Asia Conference, vol. 3, Mar. 6-7, 2010, pp. 130-133.

W, Fei et al.,"Comparison of Cogging Torque Reduction in Permanent Magnet Brushless Machines by Conventional and Herringbone Skewing Techniques", IEEE Transactions, Sep. 2013, vol. 28, Issue 3, pp. 664-674.

(56) References Cited

OTHER PUBLICATIONS

S. Han et al., "Design Tradeoffs between Stator Core Loss and Torque Ripple in IPM Machines," IEEE Industry Applications society Annual Meeting, Oct. 5-9, 2008, pp. 1-8.
U.S. Non-Final Office Action issued in connection with related U.S. Appl. No. 14/085,953 dated Jan. 11, 2017.
U.S. Non-Final Office Action issued in connection with related U.S. Appl. No. 14/559,037 dated Jan. 13, 2017.
U.S. Non-Final Office Action issued in connection with related U.S. Appl. No. 14/974,848 dated Jan. 13, 2017.
U.S. Final Office Action issued in connection with related U.S. Appl. No. 14/974,848 dated Apr. 21, 2017.
Unofficial English Translation of Chile Office Action issued in connection with related CL Application No. 201402963 dated May 11, 2017.
U.S. Final Office Action issued in connection with related U.S. Appl. No. 14/559,037 dated May 19, 2017.
U.S. Final Office Action issued in connection with related U.S. Appl. No. 14/085,953 dated May 24, 2017.

* cited by examiner

ELECTRIC MACHINE HAVING REDUCED TORQUE OSCILLATIONS AND AXIAL THRUST

CROSS REFERENCE TO RELATED APPLICATIONS

This application is a Continuation-In-Part of U.S. patent application Ser. No. 14/019,630, entitled: ELECTRIC MACHINE HAVING OFFSET ROTOR SECTIONS, as amended.

BACKGROUND OF THE INVENTION

The present invention relates generally to electric machines and, more particularly, to electric machines, such as interior permanent magnet machines and Synchronous Reluctance motor machines, that have offset rotor sections, thereby reducing torque oscillations and axial thrust in the rotor structure of the electric machine.

One general application for electric machines, and interior permanent magnet (IPM) machines in particular, is for use traction applications, such as when electric wheel motors (e.g., IPM) are connected to the wheels via a gearbox. This application typically requires very high torque at low speeds and yet maintenance of the rated power over a very wide speed range (e.g., on the order of 15:1).

A shortcoming of these types of motors is they are prone to high torque oscillations, or torque "ripple". Further, depending on the magnitude of the torque "ripple" of the machine there may result damage to the rotor, the gearbox, and/or the mechanical system(s) connected to the IPM (due to fatigue or excessive torque). Additionally, the frequency of the torque ripple might excite resonant modes of the mechanical system(s), further posing an additional threat to the IPM and/or surrounding systems. With regards to torque ripple, similar attributes and shortcomings may also be found, in part, with Synchronous Reluctance motors.

There have been various attempts at reducing torque ripple. One trend is to construct the stator such that there are an odd number of stator slots per pole pair. While reducing torque ripple, this technique suffers from high core losses. Another technique for torque ripple reduction is stator skewing, wherein the stator is typically skewed in a single helicoidal path configuration. This technique, while aiding in the reduction of torque ripple, can add manufacturing complexity and costs while also introducing axial thrust to the stator assembly. Accordingly, there is an ongoing need for improving on current electric machine technologies and/or manufacturing thereof that address at least one of complexity, cost, efficiency, and/or performance without some of the current tradeoffs encountered with current methodologies.

BRIEF DESCRIPTION

The present invention addresses at least some of the aforementioned drawbacks by providing improvements to electric machines, such as an interior permanent magnet (IPM) machines and Synchronous Reluctance motors, such that the electric machines may be both manufactured more efficiently and/or operate with more technical efficiency. More specifically, the present invention is directed to an IPM machine or a Synchronous Reluctance motor that includes offset rotor sections. Further aspects of the present invention include components and assemblies that provide for the offset features of these electric machines. In an embodiment, a vehicle, such as an underground mining vehicle, may employ compact traction motors that utilize aspects of the present invention.

Aspects of the present invention help reduce torque ripple or oscillation as well as cancels out the axial force component typically introduced by other skewing methodologies. This feature may be particularly advantageous in a traction motor application where the smoother torque profile and absence of axial thrust can typically yield increased life and reliability of the entire drive-train, due to the decreased stress of the various components of the drive-train (e.g., bearings, gearbox, drive shaft(s), etc.).

Therefore, in accordance with one aspect of the invention, a component comprises a longitudinal axle, having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a profile of all midpoints of the plurality of keybars is helicoidal around the longitudinal axle, further wherein the helicoidal profile comprises one or more helicoidal paths.

In accordance with another aspect of the invention, an assembly comprises: a plurality of motor rotor sections; and a rotor bar extending through the plurality of motor rotor sections, wherein the rotor bar and the plurality of motor rotor sections are configured to step-skew the plurality of motor rotor sections from each other, wherein a portion of the plurality of motor rotor sections are skewed in a herringbone configuration.

In accordance with another aspect of the invention, an Interior Permanent Magnet (IPM) machine rotor comprises: a plurality of motor rotor sections, wherein the plurality of motor rotor sections are step-skewed in a herringbone configuration.

In accordance with another aspect of the invention, a Synchronous Reluctance motor rotor comprises: a plurality of motor rotor sections, wherein the plurality of motor rotor sections are step-skewed in a herringbone configuration.

In accordance with another aspect of the invention, a method of assembly comprises: providing a plurality of rotor core sections; and assembling each of the plurality of rotor core sections on a keyed axle shaft, said keyed axle shaft includes at least one key thereon, wherein the at least one key accommodates the plurality of rotor core sections, thereby defining a skewed rotor core stack assembly, wherein at least a portion of the skewed rotor core stack assembly is skewed in a V-shaped configuration.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention provide a motor design methodology that offers several advantages including both an easier manufacturing process that leads to lower production costs, coupled with a reduction in torque ripple. This design, in turn, translates into less stringent requirement in the design of a gearbox connected between the electric motor employing this design with the wheel.

Further aspects of the present invention provide for a motor design methodology that both reduces peak torque and torque oscillation as well as reduces and/or eliminates axial thrust that the mechanical components are subjected to. Ultimately, these advantages translate into less fatigue, and, thus, reduction in component oversizing requirements. This, in turn, results in more reliable, longer-lived, and more compact drive-train componentry.

Torque ripple for purposes herein can be estimated by the following equation:

$$T_{ripple} = (T_{max} - T_{min})/T_{avg}$$

Figure 1:
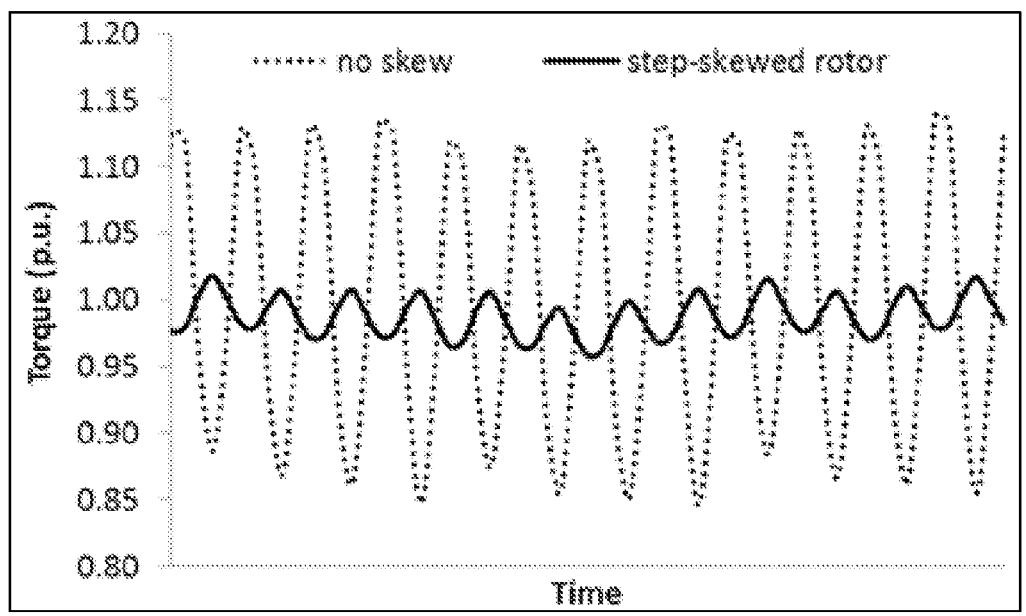
FIG. 1 is a graph illustrating torque over time and the effects in reducing torque ripple in applying aspects of the present invention.

Aspects of the present invention solves both a manufacturing and electro-mechanical problem with IPM machines in that certain embodiments allow for the use of multiple short rotor sections which facilitates the insertion of permanent magnets into the rotor structure, thereby reducing the risk of damage to magnets and/or rotor sections or rotor laminations. Additionally, from an electro-mechanical point of view, certain embodiments angularly shift multiple rotor sections with respect to adjacent rotor sections (e.g., shift by a certain constant angle along the same direction), which causes a large reduction in the amplitude of torque ripple. The reduction in torque ripple results in a concomitant reduction in gearbox size and/or greater safety factor in the motor/gearbox system. FIG. 1 depicts a graph showing torque over time. As shown, the amount of torque ripple is greatly decreased when aspects of the present invention (e.g., step-skewed rotor) are applied to a rotor in an electric machine.

Certain symbols and definitions and concomitant equations are used herein, per the following Table:

| symbol | definition | equation |
|---|---|---|
| $N_{sect}$ | Number of rotor sections | |
| $\theta_{skew}$ | angular position difference of start and end sections of one skewing path, for reduction of torque ripple | |
| $N_{path}$ | Number of different skewing paths applied to the whole rotor stack. $N_{path}$ also divides the rotor in $N_{path}$ portions | |
| B | Number of rotor sections contained in each rotor portion. B is an integer. | $B = N_{sect}/N_{path}$  Eq. (1) $B \in \mathbb{N}$ |
| $\theta_{sect}$ | skew angle between adjacent rotor sections | In an embodiment:  Eq. (2) $\theta_{sect} = \theta_{skew}/(B-1)$ |
| $\theta_{key}$ | constant angle that is required to physically separate the key-bars | $\theta_{key} = \theta_{sect} + \theta_0$  Eq. (3) |
| $\theta_0$ | additional mechanical offset that allows for the adjacent rotor sections to physically step skew adequately | In one embodiment:  Eq. (4) $\theta_0 = 360/N_{poles}$ |
| $N_{poles}$ | Number of rotor poles | |

Referring to the table (above), $N_{path}$ is the number of skewing paths applied to the rotor stack. $N_{path}=1$ provides the conventional step-skewing that is discussed in the related patent application referenced above, U.S. application Ser. No. 14/019,630. For $N_{path}>1$, then the rotor length is divided into $N_{path}$ portions, each portion having a certain amount of B sections, from start to end sections of each portion a total angular difference, $\theta_{skew}$, is applied, adjacent portions are skewed in opposite directions. A skewing configuration termed "herringbone" skewing is realized for $N_{path}=2$, the start and end sections of the whole rotor are aligned and no angular displacement is measurable between the two.

In certain embodiments of the present invention the rotor of the IPM machine is divided into $N_{sect}$ axial sections, wherein each section is offset (or skewed) from its 'neighboring', adjacent section with an angle $\theta_{sect}=\theta_{skew}/(B-1)$, wherein "$\theta_{skew}$" is the rotor skew angle between the end sections of one skewing path. In this manner, the IPM machine can feature a lower torque ripple than that obtained in the axially straight rotor version. Such torque ripple mitigation will result in lower fatigue on the mechanical parts, thereby improving life of the machine and the various connected mechanical components. Further, because the need to push the magnets through the entire rotor stack is no longer required, the insertion of pre-magnetized magnets is thereby made easier.

In an embodiment, the rotor assembly may use a number $N_{sect}$ of separate rotor sections to reduce the length along which the magnets must be pushed, thus reducing the risk of damage. These pre-assembled $N_{sect}$ sections are then mounted on a motor shaft, resulting in a skewed rotor assembly. In some particular embodiments, compression may be applied to the assembly after compression plates, or other elements, are applied to either end of the rotor assembly.

Additionally, in an embodiment a small angular rotation between adjacent rotor sections is provided that will also help improve the profile of the electromagnetic torque produced by the motor. In fact, the presence of high order harmonics in both stator and rotor fluxes introduces a series of sinusoidally-varying torque components (with zero average value) superimposed to the constant torque that is required. Shifting the various sections of the rotor all by the same angle and along one or more skewing paths, the interaction of stator and rotor fluxes will not be the same along the axial length of machine, yet there will be some phase delay between the various sections. By providing a proper shift angle such phase delay can be used to produce equal and opposite sinusoidal torque components acting on the various sections of the rotor, thus filtering out most of the torque ripple yet with little reduction to the average value of torque.

This skew angle, or small angular rotation, between adjacent rotor sections is found in equation [2]:

$$\theta_{sect}=\theta_{skew}/(B-1) \quad [2]$$

The proper value of the shifting between the sections should be carefully evaluated for each machine, depending upon its geometry, winding scheme and supply conditions. In one embodiment of the invention, for example, the rotor is 300 mm long and divided into 5 rotor sections, each 60 mm long and shifted 1.25° (i.e., $\theta_{sect}$) from its neighbors. In this particular embodiment, the peak-to-peak ripple is found to be only 6% the average torque, compared to the value of 30% obtained in a case of straight rotor. Meanwhile, the average torque is reduced by just 1%.

Another characteristic of certain embodiments is that in order to accommodate with the shifted rotor sections, the shaft may include many key-bars along the axial length, to lock the rotor sections to the shaft. Such key-bars may be both axially and angularly displaced. In the angular direction such displacement is equal to the required shift between sections, $\theta_{sect}$, to reduce torque ripple plus a constant angle, $\theta_0$, that may be required to physically separate the key-bars enough so as to accommodate the locking of rotor sections to the shaft. For example, in the above mentioned embodiment, each key-bar is displaced by 61.25°. (e.g., $\theta_{key}$=61.25°; $\theta_{sect}$=1.25°; $\theta_0$=60°). This total angle between adjacent keybars, $\theta_{key}$, is shown in equation [3]:

$$\theta_{key}=\theta_{sect}+\theta_0 \quad [3]$$

$\theta_0$ is an additional mechanical offset that allows for the adjacent rotor sections to more easily physically accommodate the step skewing in relation to each other more easily.

In a particular embodiment, $\theta_0$ is related to the quantity of rotor poles $N_{poles}$ in the rotor assembly. In particular embodiments the value $\theta_0$ is found in equation [4]:

$$\theta_0=360/N_{poles} \quad [4]$$

In other embodiments, $\theta_0$ may be virtually any value and wholly unrelated to quantity of poles. In certain embodiments, $\theta_0$ may even have a value of zero (0).

In another embodiment of the present invention, the rotor sections 60 (e.g., solid core or rotor laminations) may feature, on their inner diameter, a series of equally displaced notches to provide proper mating with the key-bars as well as a guide for the section shifting.

Figure 2:
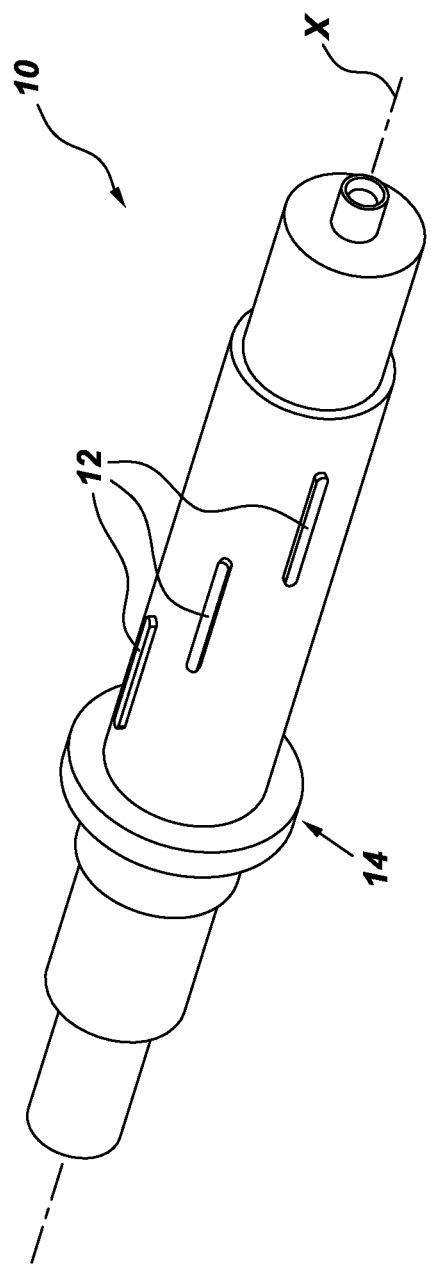
FIG. 2 is a perspective view of a rotor shaft component, according to an embodiment of the present invention.

Referring to FIG. 2, a perspective view of a rotor shaft component, according to an embodiment, is shown. The rotor shaft component, or axle, is shown as 10. As will be discussed herein the axle 10 may be used in coordination with a rotor assembly; a stator; and, thereby in combination be part of an electric machine. The axle 10 may comprise a longitudinal element, or axle, along a longitudinal axis, denoted X. Depending on the embodiment, the axle 10 may further comprise one or more end elements 14 that aid in the use of the axle 10 with the various rotor sections as discussed herein. The length of the axle 10 further comprises a plurality of keybars 12 extending from the body of the axle 10.

The quantity of keybars 12 may vary depending on the configuration of the rotor assembly and/or electric machine that it is used in combination with. The quantity may be any quantity from two to virtually infinite, although it is envisioned that a typical quantity of keybars 12 for many, but not all, embodiments is in the magnitude of between three and ten keybars 12 along the axle 10. The location and configuration of the plurality of keybars 12 is significant in that they aid in providing for the skewing of various rotor sections thereon as discussed herein. The plurality of keybars 12 are configured to match with corresponding plurality of notches on a plurality of rotor sections to provide the step skewing of rotor sections, and, in certain embodiments, continuous skewing of rotor laminations. The plurality of keybars 12 is located so that they are distributed axially along and circumferentially around the shaft of the axle 10. The plurality of keybars 12 are substantially parallel to the longitudinal axis, X. That is the midpoints of plurality of keybars 12 would define a helical, or helicoidal, pattern around and along the axle 10. In an embodiment, a portion of each keybar 12 may overlap, or extend partially, in the axial length with another adjacent keybar 12. Although FIG. 2 shows straight keybars 12, in other embodiments, other shapes and configuration of keybars 12 may be used, including for example helical-shaped keybar(s). (See e.g., FIG. 8).

Various methods for manufacturing the component 10 may be used in various embodiments. For example, the various elements (e.g., 12, 14) of the component 10 may be created by the removal of material from a single, or multiple, ingot elements. In another embodiment, material may be removed along the shaft of the axle 10 so as to define voids, or recesses, configured to receive separate keybar elements, or protrusions, 12 that could be fixedly, or removably, attached to the plurality of voids. In still other embodiments, various elements (e.g., 12, 14, and the like) may be attached via other means and manners.

Figure 6:
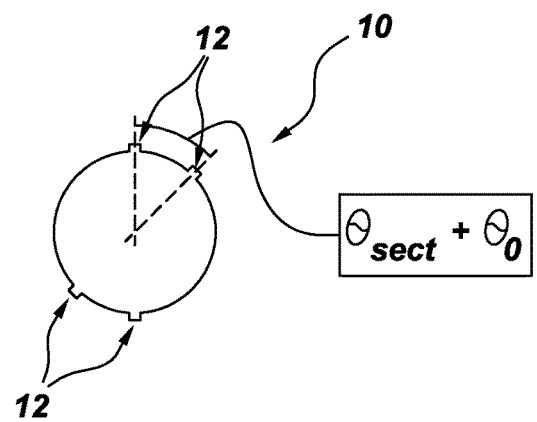
FIG. 6 is an end view of a rotor shaft component, according to an embodiment of the present invention.
Figure 7:
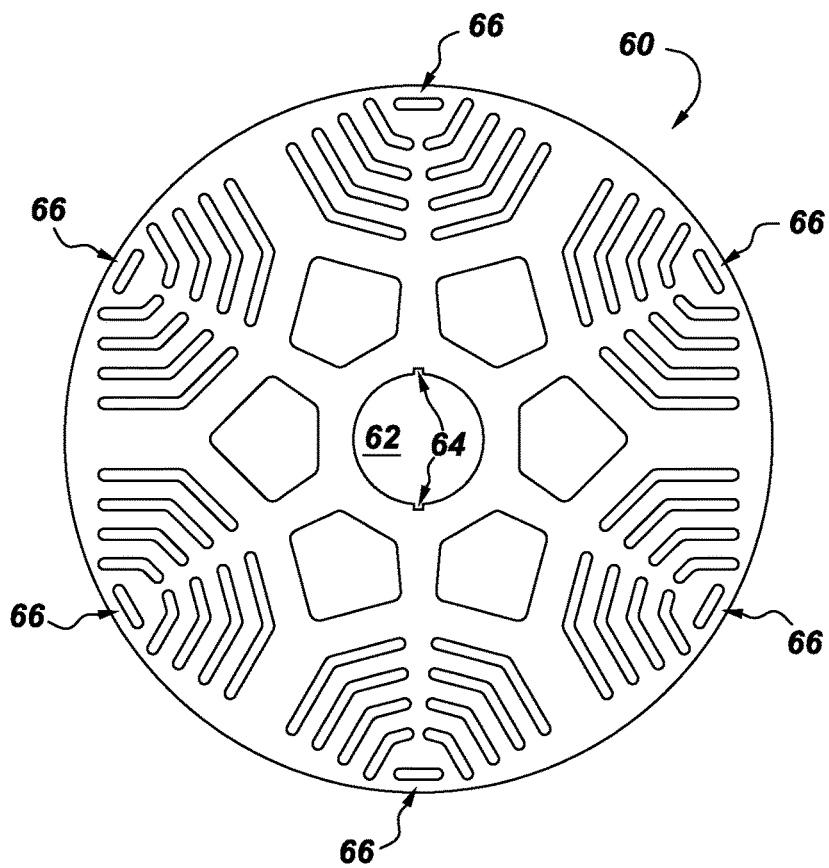
FIG. 7 is a top view of a rotor section, according to an embodiment of the present invention.

Referring to FIG. 6 along with FIG. 2, an end view of an embodiment of a section of the axle 10 is shown. FIG. 6 is showing the key bars 12 configured for two adjacent rotor sections (not shown). The offset angle between the adjacent key bars 12 is depicted as $\theta_{key}$, wherein $\theta_{key}=\theta_{sect}+\theta_0$, wherein $\theta_{key}$ comprises an electrical offset suitable to reduce torque ripple by at least partially cancelling out ripple components in the adjacent rotor sections, and further wherein $\theta_0$ comprises the additional mechanical offset that allows for the physical accommodation of adjacent rotor sections to step skew adequately. As shown, two keybars for two corresponding rotor sections (not shown) are shown at approximately "12 o'clock" and "2 o'clock". In the embodiment shown, the keybars for the other rotor sections of the rotor assembly are omitted for purposes of clarity. In the particular embodiment shown, additional balancing keybars 12 are shown and located 180° from the two key bars 12. Thus, the two balancing keybars 12 are shown at approximately "6 o'clock" and "8 o'clock". The embodiment shown (along with the omitted keybars) would be a suitable axle 10 for use, for example, in a 6-pole IPM or Synchronous Reluctance Machine. The shaft keybars 12 in the axle 10 of FIG. 6 are configured to match corresponding keybar notches 64 shown in the inner opening 62 of the rotor section 60 shown in FIG. 7. By way of example only, the 6 rotor poles of the rotor section 60 of FIG. 7 when used with the axle 10 depicted would results in offsets between adjacent rotor sections 60 of 1.25°.

Figure 4:
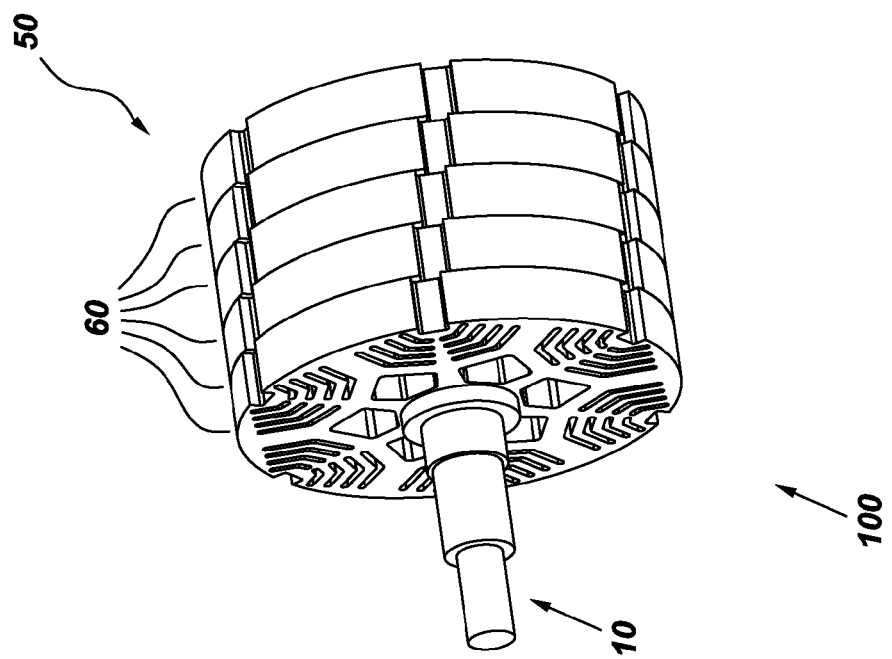
FIG. 4 is a perspective view of the completed assembly of FIG. 3, according to an embodiment of the present invention.
Figure 3:
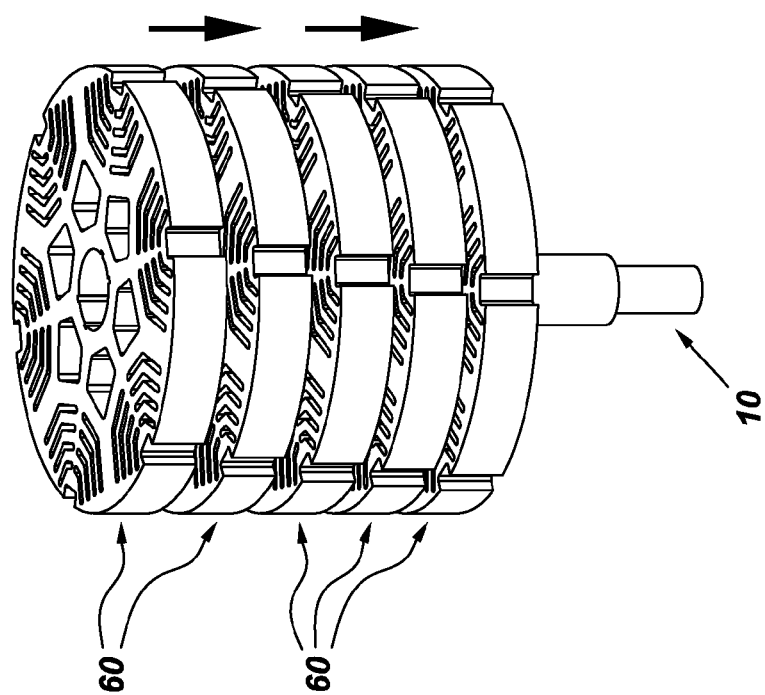
FIG. 3 is a perspective exploded view of the assembling of rotor structure components and the rotor shaft component of FIG. 2, according to an embodiment of the present invention.

Referring to FIGS. 3 and 4, a plurality of rotor sections 60 are shown being assembled along an axle shaft 10 to form a rotor assembly 50 in FIG. 3 and shown completely assembled in FIG. 4. The rotor stack, or assembly, 50 comprises a plurality of pre-manufacture rotor sections 60, assembled together on the shaft 10. In an embodiment, each of the plurality of rotor sections 60 is installed in a step-skewed configuration. Two skewing options include both a 1-slot pitch and half-slot pitch angular displacement between the two ends of the rotor stack 50. The angular rotation between two consecutive rotor sections 60 can be calculated from Equation [2] stated in the Table above.

An analysis has been conducted while delivering rated torque, the condition when the absolute value of the torque ripple is largest and, thus, more harmful to the mechanical components connected to the shaft. The rotor assembly 50 has been assumed being made of five (5) rotor sections 60.

As shown in FIGS. 3 and 4, each rotor section 60 may be premanufactured. The rotor sections 60 are each place in a skewed fashion on the axle 10. As every rotor section 60 has a corresponding keybar 12, the plurality of rotor sections 60 comprise a rotor assembly, or stack 50. Thus, for an electric machine (e.g., IPM or Synchronous Reluctance Machine) the angular offset between consecutive keybars 12 can be found from equation [2], stated above and found in the Table.

Figure 5A:
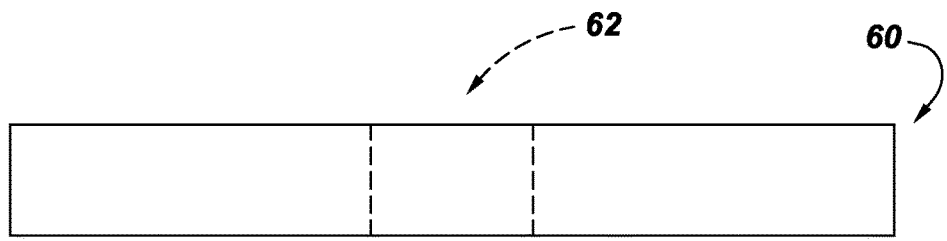
FIG. 5A is a side elevation view of a solid rotor core section, according to an embodiment of the present invention.
Figure 5B:
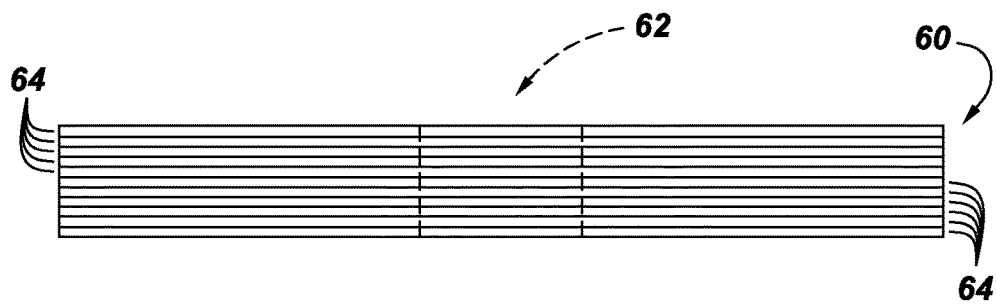
FIG. 5B is a side elevation view of a rotor core section comprised of a plurality of rotor laminations, according to an embodiment of the present invention.

Referring to FIGS. 5A and 5B, two embodiments of a rotor section 60 are shown according to embodiments of the present invention are shown in elevation views. The first embodiment (FIG. 5A) depicts a single rotor section 60 that includes an opening 62 therethrough and further comprises a solid core rotor core section. The second embodiment (FIG. 5B) depicts a single rotor section 60 that similarly includes an opening therethrough, but contrastingly further comprises a plurality of rotor laminations 64. It should be apparent that the quantity of rotor laminations 64 may vary from the embodiment depicted in FIG. 5B. Further, the rotor laminations 64 may be fixedly attached to each other to form the particular separate rotor sections 60. Still further, in other embodiments, the rotor laminations 64 may be freely stacked (e.g., non-fixedly attached) with the particular rotor sections 60.

Figure 8:
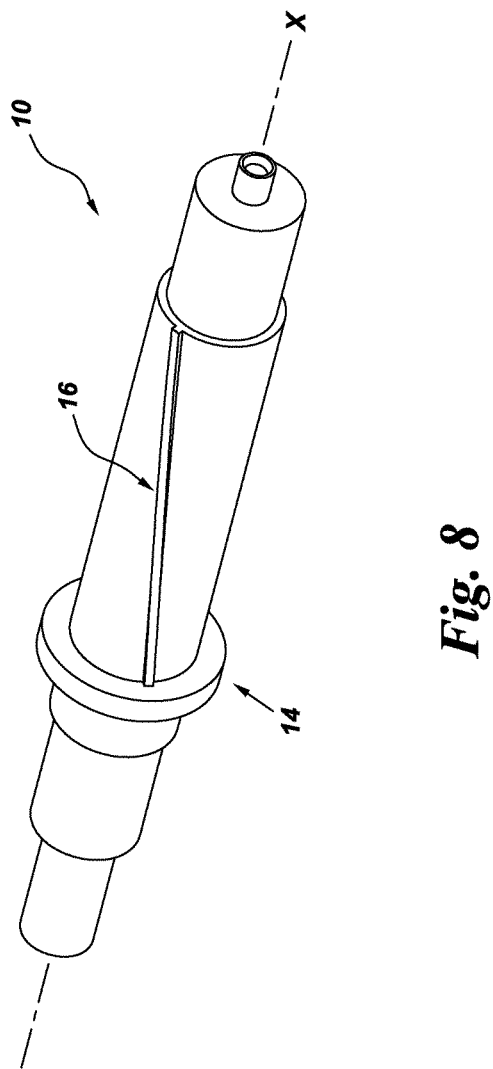
FIG. 8 is a perspective view of a rotor shaft component, according to another embodiment of the present invention.

Referring to FIG. 8, another embodiment of a rotor axle component 10 is shown in perspective view. As depicted, the axle component 10 may include an end element 14 that aids in the keeping of the rotor sections 60 thereon. In the embodiment shown, the axle 10 further comprising a keybar 16 configured in a continuous helical profile, as opposed to the straight keybars 12 shown, for example in FIG. 2. Depending on the embodiment, the helical keybar 16 may be a single keybar configured in a continuous helicoidal pattern partially around the shaft of the axle component 10. In another embodiment, two continuous helical keybars 16 may be located 180° opposite each other on the shaft of the axle component 10. In this manner, the two helical keybars 16 act as balancing keybars to each other.

In an embodiment of the present invention the rotor axle component 10 depicted in FIG. 8 may be used with rotor sections 60 as those depicted in FIG. 5B. That is the plurality of rotor sections 60 each comprised of a plurality of rotor laminations 64 may be placed on the axle component 10 having at least one continuous helical keybar 16. In another embodiment, the rotor axle component 10 depicted in FIG. 8 may be used with rotor sections 60 as those depicted in FIG. 5A. That is the plurality of rotor sections 60 each comprise solid core rotor sections and may be placed on the axle component 10 having at least one continuous helical keybar 16. In this manner, the rotor stack, or assembly, will have a continuously skewed configuration amongst the plurality of rotor sections 60.

In certain embodiments, the rotor sections of a rotor assembly may be skewed in such a fashion that both torque oscillation, or ripple, and axial thrust between stator and rotor are mitigated. The skewing may be helicoidal in fashion, as discussed herein, but the step-skewing may be in two (or more) helicoidal lines. The skewing may be termed a herringbone or V-shaped configuration, when $N_{path}=2$. In embodiments, this herringbone configuration may be repeated entirely or partially (e.g., $N_{path}>2$).

In these embodiments, the rotor sections may comprise a configuration such that the rotor assembly may comprise $N_{sect}$ rotor sections of equal length, wherein $N_{sect}$ is the quantity of rotor sections. The torque oscillation is minimized and the axial thrust is completely eliminated when the rotor sections in the assembly are divided into an even number of $N_{path}$ sections. Each of the rotor sections in the first half portion of the rotor length B/2 sections of each rotor portion is shifted by a constant angle, $\theta_{shift}$, with respect to the adjacent ones, thus creating a total shift from start to the middle portion of the rotor stack of $\theta_{sect}=\theta_{skew}/(B-1)$. The remaining B/2 sections occupying the second axial half of each rotor portion are shifted by the equal, but negative, angle, $-\theta_{shift}$ with respect to each other, totaling an overall angular shift from the middle portion of the rotor stack to end of $\theta_{skew}$.

The effectiveness of reduction of torque ripple depends upon the values of B and $\theta_{shift}$, the axial force is cancelled by the juxtaposition of the 2 rotor halves skewed in opposite directions. When observing the skewing directions of these juxtaposed rotor sections, they resemble a V-shaped or herringbone profile.

Note that other configurations of skewing are possible in certain embodiments. For example, $N_{path}>2$ wherein the herringbone skewing configuration is repeated. Note too that when $N_{path}$ is an even value and that the consecutive rotor portions are skewed as "mirror" images of each other (e.g., skewed symmetrically), the axial thrust is cancelled. Contrastingly, for odd values of $N_{path}>1$, the axial thrust may be reduced but not cancelled entirely (i.e., reduced to a zero value).

Note that as the value of $N_{path}$ increases in the rotor stack assembly (while keeping the same number of sections $N_{sect}$ in the rotor stack), the effectiveness in reducing torque oscillations is diminished. Alternatively stated: while there may be certain manufacturing or other reasons for doing so, there are no apparent advantages to constructing a rotor assembly having an $N_{path}>2$.

Figure 10:
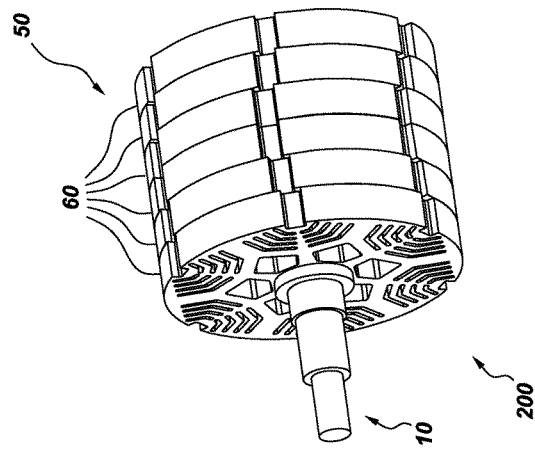
FIG. 10 is a perspective view of the completed assembly of the rotor structure of FIG. 9, according to an embodiment of the present invention.
Figure 9:
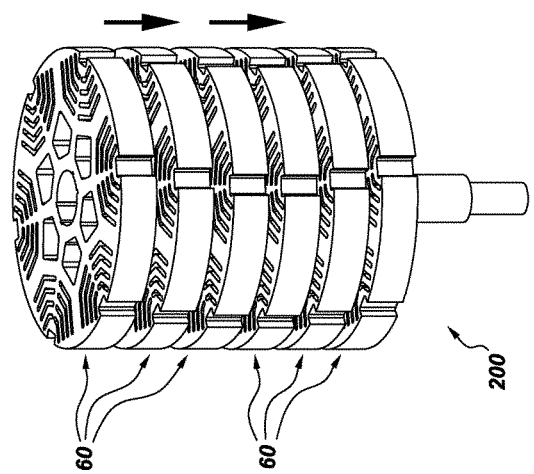
FIG. 9 is a perspective exploded view of the assembling of rotor structure components and a rotor shaft component, according to an embodiment of the present invention.

Referring to FIGS. 9 and 10 collectively, perspective views of a rotor structure of an embodiment, in exploded and completed state, are respectively shown. As shown, each rotor section 60 may be pre-manufactured. The rotor sections 60 are each place in a skewed fashion on the axle 10. As every rotor section 60 has a corresponding keybar 12 (not shown), the plurality of rotor sections 60 comprise a rotor assembly, or stack 50. The rotor assembly 50 then, when assembled with stator assembly, may comprise an electric machine 200. The rotor assembly 50 may comprise a plurality of rotor sections 60 (e.g., six sections 60 are depicted in FIGS. 9 and 10).

Further, as shown there may be an even (e.g., six) quantity of rotor sections 60 in the assembly 50. This way, there are 2 aligned (i.e., skew=0) rotor sections 60 in the center of the assembly 50. Otherwise, if there was a single, center rotor section 60, an axis of symmetry would "cut" this single, center section into a shorter (½) length than the other rotor sections on each side of the symmetry axis. This would result in less torque and less of a reduction of torque oscillation with the final assembly.

Clearly, other embodiments other than those depicted and described herein may be used without departing from the intent of the present invention. For example, as the embodiment depicted in FIGS. 9 and 10 illustrates what could be termed as a "V" configuration of skewing, other embodiments of skewing may be used. For example, and without limitation, the rotor structure may be arranged in a multiple-V configuration (e.g., VV, VVV, etc.). That is the rotor sections could define, in their skewing, more than one "V" configuration. Similarly, although a uniform quantity and a uniform thickness of rotor sections are shown on each "side", or "leg", of the V-configuration, in some embodiments the overall thickness and/or quantity of rotor sections on each side of the V-configuration may be unequal (e.g., non-uniform). Similarly, in still other embodiments, the rotor sections could be configured such that portions of the rotor assembly may be unskewed, while other rotor sections in the rotor assembly are skewed with one or more V-configurations.

While embodiments discussed herein include uniform lengths of rotor sections and uniform angular shift between rotor sections throughout the $N_{path}$, in other embodiments this may vary. In some embodiments, the length of the rotor sections may vary, or differ, over the $N_{path}$. Similarly, in some embodiments, the angular shift between adjacent rotor sections may differ, or vary, over the $N_{path}$ sections of the rotor.

A method of assembling a rotor core assembly may include assembling each of the rotor core sections on a keyed axle shaft, as discussed herein. The keyed axle shaft, depending on the embodiment, may have one or more keys thereon. The key(s) accommodate the multiple rotor sections, thereby defining a skewed (continuous or step-skewed) rotor core stack assembly. The rotor core stack assembly may have a compressive force applied to it. In an embodiment, one or more compression plates may be first adjoined to one, or both, end(s) of the rotor core stack assembly, prior to compression. In the IPM embodiment, a plurality of magnets may be inserted through the rotor core sections and affixed to the rotor core sections. In an embodiment, the affixing of magnets may be done by one of: infusing a resin on the rotor core sections; clamp the magnets with a filler or wedge material; and, shrinking the magnets into the rotor core sections. The method is suitable for IPM or Synchronous Reluctance motor (with exception of magnets; step or continuous skewed configurations; and, solid core or plurality of lamination rotor sections.

Under aspects of the present invention, the components 10, 60 and assemblies 50 and the electric machines 100 discussed herein may be used as a traction motor for virtually any vehicle. A vehicle support frame (not shown) may be connected to the one or more electric machine 100. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

Note that while various embodiments discussed herein describe the improvements to be used in and with IPM, it should be apparent that the various aspects of the present are equally suited for use in and with for example Synchronous Reluctance machines. Aspects of the invention are suitable for use with other machines including, but not limited to, flux switching machines, switch reluctance machines, and the like.

Therefore, in accordance with one aspect of the invention, a component comprises a longitudinal axle, having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a profile of all midpoints of the plurality of keybars is helicoidal around the longitudinal axle, further wherein the helicoidal profile comprises one or more helicoidal paths.

In accordance with another aspect of the invention, an assembly comprises: a plurality of motor rotor sections; and a rotor bar extending through the plurality of motor rotor sections, wherein the rotor bar and the plurality of motor rotor sections are configured to step-skew the plurality of motor rotor sections from each other, wherein a portion of the plurality of motor rotor sections are skewed in a herringbone configuration.

In accordance with another aspect of the invention, an Interior Permanent Magnet (IPM) machine rotor comprises: a plurality of motor rotor sections, wherein the plurality of motor rotor sections are step-skewed in a herringbone configuration.

In accordance with another aspect of the invention, a Synchronous Reluctance motor rotor comprises: a plurality of motor rotor sections, wherein the plurality of motor rotor sections are step-skewed in a herringbone configuration.

In accordance with another aspect of the invention, a method of assembly comprises: providing a plurality of rotor core sections; and assembling each of the plurality of rotor core sections on a keyed axle shaft, said keyed axle shaft includes at least one key thereon, wherein the at least one key accommodates the plurality of rotor core sections, thereby defining a skewed rotor core stack assembly, wherein at least a portion of the skewed rotor core stack assembly is skewed in a V-shaped configuration.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A component comprising:
a longitudinal axle, having a plurality of keybars extending outward from a surface of the longitudinal axle, wherein each of the plurality of keybars are disposed axially along and circumferentially around the longitudinal axle, wherein an axis of the plurality of keybars is parallel to the longitudinal axle, and wherein a profile of all midpoints of the plurality of keybars is helicoidal around the longitudinal axle, and wherein each of the plurality of keybars are configured to receive a corresponding key on a corresponding rotor section of a plurality of rotor sections to define a stacked rotor assembly having a step-skewed configuration, except for two or more rotor sections in a center of the stacked rotor assembly, thereby resulting in a "V" configuration of skewing.

2. The component of claim 1, wherein each of the plurality of keybars are straight.

3. The component of claim 1, the longitudinal axle comprising a plurality of sequential longitudinal sections, wherein each of the plurality of keybars correspond to a longitudinal section of the longitudinal axle.

4. The component of claim 3, wherein each of the plurality of keybars extend partially longitudinally from its corresponding longitudinal section to an adjacent longitudinal section.

5. The component of claim 1, wherein each of the plurality of keybars are configured to receive a corresponding key on a corresponding rotor section of a plurality of rotor sections, thereby defining a stacked rotor assembly having a continuously-skewed configuration.

6. The component of claim 5, wherein each of the plurality of rotor sections comprises a plurality of rotor laminations.

7. The component of claim 5, wherein each of the plurality of rotor sections comprises a solid core section.

8. The component of claim 5, wherein the plurality of keybars are disposed circumferentially around the longitudinal axis, wherein a skew angle, $\theta_{sect}$, is an angle between adjacent rotor sections.

9. The component of claim 8, wherein the skew angle, $\theta_{sect}$, is selected to provide a shift in a torque vs. rotor position profile of the plurality of rotor sections, thereby reducing torque ripple.

10. The component of claim 8, wherein an offset $\theta_{key}$ between adjacent keybars comprises $\theta_{sect}+\theta_0$, wherein $\theta_0$ comprises an additional mechanical offset for clearance for adjacent rotor sections.

11. The component of claim 1, wherein each of the plurality of keybars are helicoidal.

12. The component of claim 1, wherein each of the plurality of keybars are configured to receive a corresponding key on a corresponding rotor section of a plurality of rotor sections, thereby defining a stacked rotor assembly having a skewed configuration, wherein the stacked rotor assembly is configured for use in one of an interior permanent magnet (IPM) machine and a Synchronous Reluctance motor.

13. The component of claim 1, wherein the plurality of keybars comprises a first set of keybars, the component further comprising a second set of keybars, wherein each of the keybars of the second set of keybars is located circumferentially opposite a keybar of the first set of keybars.

14. An assembly comprising:
a plurality of motor rotor sections; and
a rotor bar extending through the plurality of motor rotor sections, wherein the rotor bar and the plurality of motor rotor sections are configured to step-skew the plurality of motor rotor sections from each other, except for two or more rotor sections in a center of the stacked rotor assembly, thereby resulting in a "V" configuration of skewing.

15. The assembly of claim 14, further comprising a plurality of end plates having the plurality of motor rotor sections located therebetween.

16. The assembly of claim 14, further comprising a plurality of magnets located within the motor rotor sections.

17. The assembly of claim 16, wherein the plurality of magnets comprise a material of at least one of ferrite, alnico, and a rare earth metal.

18. An interior permanent magnet (IPM) machine comprising the assembly of claim 16; and, a stator surrounding the assembly.

19. The IPM machine of claim 18, wherein the assembly is configured to reduce at least one of torque ripple and axial thrust in the IPM machine.

20. The assembly of claim 14, wherein each of the plurality of motor rotor sections comprise a solid rotor core section.

21. The assembly of claim 14, wherein each of the plurality of motor rotor sections comprise a plurality of rotor laminations.

22. A Synchronous Reluctance motor comprising the assembly of claim 14; and, a stator surrounding the assembly.

23. The Synchronous Reluctance motor of claim 22, wherein the assembly is further configured to reduce at least one of torque ripple and axial thrust in the Synchronous Reluctance motor.

24. An Interior Permanent Magnet (IPM) machine rotor comprising:
a plurality of motor rotor sections, wherein the plurality of motor rotor sections are step-skewed, except for two or more rotor sections in a center of the stacked rotor assembly, thereby resulting in a "V" configuration of skewing.

25. The IPM machine rotor of claim 24, wherein the plurality of motor rotor sections are laminated.

26. The IPM machine rotor of claim 24, wherein the plurality of motor rotor sections are solid core.

27. A Synchronous Reluctance motor rotor comprising:
a plurality of motor rotor sections, wherein the plurality of motor rotor sections are step-skewed, except for two or more rotor sections in a center of the stacked rotor assembly, thereby resulting in a "V" configuration of skewing.

28. The Synchronous Reluctance motor rotor of claim 27, wherein the plurality of motor rotor sections are laminated.

29. The Synchronous Reluctance motor rotor of claim 27, wherein the plurality of motor rotor sections are solid core.

* * * * *